US012676551B2

(12) United States Patent
Biró

(10) Patent No.: US 12,676,551 B2
(45) Date of Patent: Jul. 7, 2026

(54) MULTILANE POWER DISTRIBUTION SYSTEM

(71) Applicant: Rolls-Royce Deutschland Ltd & Co KG, Blankenfelde-Mahlow (DE)

(72) Inventor: Norbert Biró, Budapest (HU)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 205 days.

(21) Appl. No.: 18/746,677

(22) Filed: Jun. 18, 2024

(65) Prior Publication Data

US 2025/0038666 A1     Jan. 30, 2025

(30) Foreign Application Priority Data

Jul. 25, 2023     (GB) ..................................... 2311376

(51) Int. Cl.
| | |
|---|---|
| *H02M 3/158* | (2006.01) |
| *H02J 1/102* | (2026.01) |
| *H02M 3/157* | (2006.01) |
| *H02J 105/30* | (2026.01) |

(52) U.S. Cl.
CPC ........... *H02M 3/1584* (2013.01); *H02J 1/102* (2013.01); *H02M 3/157* (2013.01); *H02J 2105/32* (2026.01)

(58) Field of Classification Search
None
See application file for complete search history.

(56) References Cited

U.S. PATENT DOCUMENTS

| | | | |
|---|---|---|---|
| 11,465,532 B2 | 10/2022 | Marius | |
| 2009/0091187 A1 | 4/2009 | Tardy | |
| 2013/0234508 A1 | 9/2013 | Eisele et al. | |
| 2022/0204173 A1 | 6/2022 | Barraco et al. | |

FOREIGN PATENT DOCUMENTS

| | | | | |
|---|---|---|---|---|
| CN | 113097990 A | 7/2021 | | |
| EP | 3421287 A1 * | 1/2019 | ............. | B60L 15/08 |
| EP | 3611045 A1 | 2/2020 | | |
| EP | 3699090 A1 * | 8/2020 | ................ | H02J 7/54 |
| WO | 2019211810 A1 | 11/2019 | | |

OTHER PUBLICATIONS

European Search Report for EP Application No. 24182305.3, mailed Dec. 13, 2024.
Great Britain Search Report for GB Application No. 2311376.4, mailed Feb. 2, 2024.

* cited by examiner

*Primary Examiner* — Crystal L Hammond
*Assistant Examiner* — Seung Ho Choi
(74) *Attorney, Agent, or Firm* — Lempia Summerfield Katz LLC

(57)     ABSTRACT
A multilane power distribution system includes a plurality of DC power sources and a plurality of load devices. Each DC power source powers at least two of the load devices, and each load device is powered by at least two DC power sources. The system further includes a DC connection network including power buses for connecting the DC power sources and the load devices. The power buses having a high side voltage rail for the positive voltage and a low side voltage rail for the negative voltage. At least two power buses are connectable by switchable elements, namely, a first switchable element for the high side voltage rails and a second switchable element for the low side voltage rails. One of the switchable elements is a pulse-width modulated switch that electrically connects the respective voltage rails in accordance with the pulse-width modulation.

13 Claims, 4 Drawing Sheets

MULTILANE POWER DISTRIBUTION SYSTEM

This specification is based upon and claims the benefit of priority from United Kingdom Patent Application GB 2311376.4, filed Jul. 25, 2023, the entire contents of which are incorporated herein by reference.

TECHNICAL FIELD

The present disclosure relates to a multilane power distribution system, in particular, for aerospace direct current (DC) power systems.

BACKGROUND

In aircraft DC power distribution systems, it is known to implement multiple energy sources such as multiple batteries or fuel cells and multiple loads such as electric propulsion units (EPUs). The multiple loads and sources may be connected through a DC distribution system using a multilane architecture, meaning that the DC distribution system includes a plurality of power buses.

The multilane architecture provides for the possibility that different lanes are connected to allow sharing of power from the batteries and/or to provide for redundancy. However, when batteries are connected, this may result in unwanted inrush current and/or a current flowing among batteries. In particular, an initial current transient of a different voltage bus may trigger a battery pack main protection, cause battery thermal runaway, and/or melt battery cell connections.

There is a need to provide a method for controlling a multilane power distribution system that allows to connect batteries or other DC power sources of such power distribution system in an efficient manner that addresses the aforementioned problems or at least provides a useful alternative to known multilane power distribution systems.

SUMMARY

The present disclosure relates to a multilane power distribution system.

In a first aspect, a multilane power distribution system is provided. The multilane power distribution system includes a plurality of DC power sources and a plurality of load devices, wherein each DC power source powers at least two of the load devices, and wherein each of the load devices is powered by at least two of the DC power sources. The multilane power distribution system further includes a DC connection network that includes power buses for connecting the DC power sources and the load devices. The power buses have a high side voltage rail for the positive voltage and a low side voltage rail for the negative voltage. At least two of the power buses are connectable by switchable elements, namely, a first switchable element for the high side voltage rails and a second switchable element for the low side voltage rails, wherein the switchable elements, when switched on, electrically connect the terminals of two of the DC power sources connected by the respective power buses.

It is provided that one of the switchable elements is a pulse-width modulated switch that electrically connects the respective voltage rails in accordance with the pulse-width modulation.

Aspects of the disclosure are thus based on the idea to provide for a pulse-width modulated switch, wherein the pulse-width modulated switch limits any inrush current when the two DC power sources are connected. The pulse-width modulated switch may control any inrush current through its duty cycle, and thereby keep the initial current within safe limits of a DC power source protection such as a battery pack protection.

A further advantage associated with the present disclosure lies in that the pulse-width modulated switch allows the voltage levels of the two DC power sources and/or of capacitive loads connected to the DC power sources to slowly align with each other, wherein, after such alignment, the pulse-width modulated switch may operate with a 100% duty cycle (fully closed).

In some embodiments, it is the first switchable element that that connects the high side voltage rails, which is a pulse-width modulated switch.

In some embodiments, the other switchable element is a contactor. This is associated with the advantage that a full galvanic isolation of the respective positive and negative lanes may be achieved. A contactor is controlled by a circuit that has a much lower power level than the switched circuit. A contactor knows two switching positions and may be monostable, wherein bi-stable contactors may be provided as well in embodiments of the disclosure. In certain examples, a contactor is activated by electromagnets. For example, when a control current flows through a solenoid coil of an electromechanical contactor, the magnetic field pulls the mechanical contacts into the active state. Without current, a spring restores the idle state, and all contacts return to their initial position. The connections for control current for the solenoid coil as well as the contacts for auxiliary circuits (if any) and currents to be switched are isolated from each other in the contactor. There is no conductive connection between control and switching contacts. Such contactors are well known to the skilled person.

In some embodiments, the system further includes a control unit that controls the state of the first and second switchable elements. In particular, the control unit may be configured to control the pulse-width modulated switch such that the duty cycle of the pulse-width modulated switch is: (a) 0% before the DC power sources are connected; (b) between 0% and 100% in a transitional period after the voltage rails are being connected, wherein the duty cycle increases over time during the transitional period; and (c) 100% after the transitional period, when the two DC power sources are fully connected.

By changing the duty cycle within the transitional period, it is possible to limit any inrush current in an efficient manner, wherein at the beginning of the transitional period the duty cycle is small (e.g., within 0.1% and 10%) such that the periods in which the respective lanes are connected is short. This implies that the amount of current that passes the switch is highly limited. Within time, when the voltage difference over the switch decreases and the voltage levels align, the duty cycle may be increased.

The change of the duty cycle within the transitional period may be configured to the circumstances. In some embodiments, the control unit is configured to control the pulse-width modulated switch such that the duty cycle of the pulse-width modulated switch rises linearly during the transitional period. However, a linear increase of the duty cycle within the transitional period is to be understood as an example only. In some embodiments, there may be provided for a nonlinear development. For example, the duty cycle may increase at the beginning of the transitional period only very slowly and increase towards the end of the transitional faster. In another example, the duty cycle is increased in the steps.

In some embodiments, the control unit may be configured to control the pulse-width modulated switch such that the initial duty cycle of the pulse-width modulated switch in the transitional period depends on the initial voltage difference over the pulse-width modulated switch. If the initial voltage difference is high, the initial duty cycle in the transitional period may be chosen to be smaller compared to the situation in which the initial voltage difference is low.

In certain examples, the control unit may be configured to centrally control all DC power sources, all switchable elements, and all load devices. Such a central control unit oversees controlling and commanding of each of DC power sources and the load devices, thereby being able to connect particular DC power sources in case need arises (such as when one of the load devices fails). Such a central control unit may also consider other parameters such as a mission profile and load demands.

In some embodiments, the pulse-width modulated switch is a solid state power controller (SSPC). This is advantageous due to the fact that SSPCs show, e.g., a fast response time, eliminate arcing during turn-off, and have a high reliability. Also, SSPCs allow to combine the function of connecting batteries and loads to a DC power bus with the function of protecting electrical installations against overload and short circuits. However, in principle, any other switches the pulse-width of which may be modulated may be used as well.

In certain examples, each DC power source may power at least two of the load devices through a respective power converter such as an inverter, wherein each power converter drives one of the load devices.

In some embodiments, the DC connection network is configured such that one considered DC power source is connectable to only one other DC power source, such that there is at least one pair of associated DC power sources, wherein the pair of associated DC power sources that are connectable are connectable through the switchable elements.

According to such embodiments, there are pairs of associated DC power sources that may be connected through a switchable element. It is thus provided that a particular DC power source may be electrically connected to a particular associated DC power source only, and not to any of the other DC power sources of the system. Such bidirectional association is associated with the advantage that a central control is simplified as two DC power sources have to be considered only when readjusting DC power source connections.

In some embodiments, the DC power source includes an electric battery. However, the present disclosure is not limited to such embodiments. For example, there may be provided fuel cells as DC power sources, a mixture of batteries and fuel cells, or a turbo generator/active rectifier.

In some embodiments, the load device includes an electric motor. However, the present disclosure is not limited to such embodiments. For example, other load devices such as pumps may be provided for.

One application of the present disclosure lies in electric Vertical Take Off and Landing aircrafts (e-VTOLs). During take-off and landing, the propulsion system of e-VTOLs is at its limit. E-VTOLs use several independent engines that provide for redundancy. A DC Electric Power Distribution Unit (which is a control unit) distributes and connects the energy sources to the loads. One of the functions of the distribution unit is to connect multiple energy sources, e.g., in case of an engine failure.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

The disclosure is now explained in more detail on the basis of embodiments with reference to the accompanying drawings in which.

DETAILED DESCRIPTION

Figure 1:
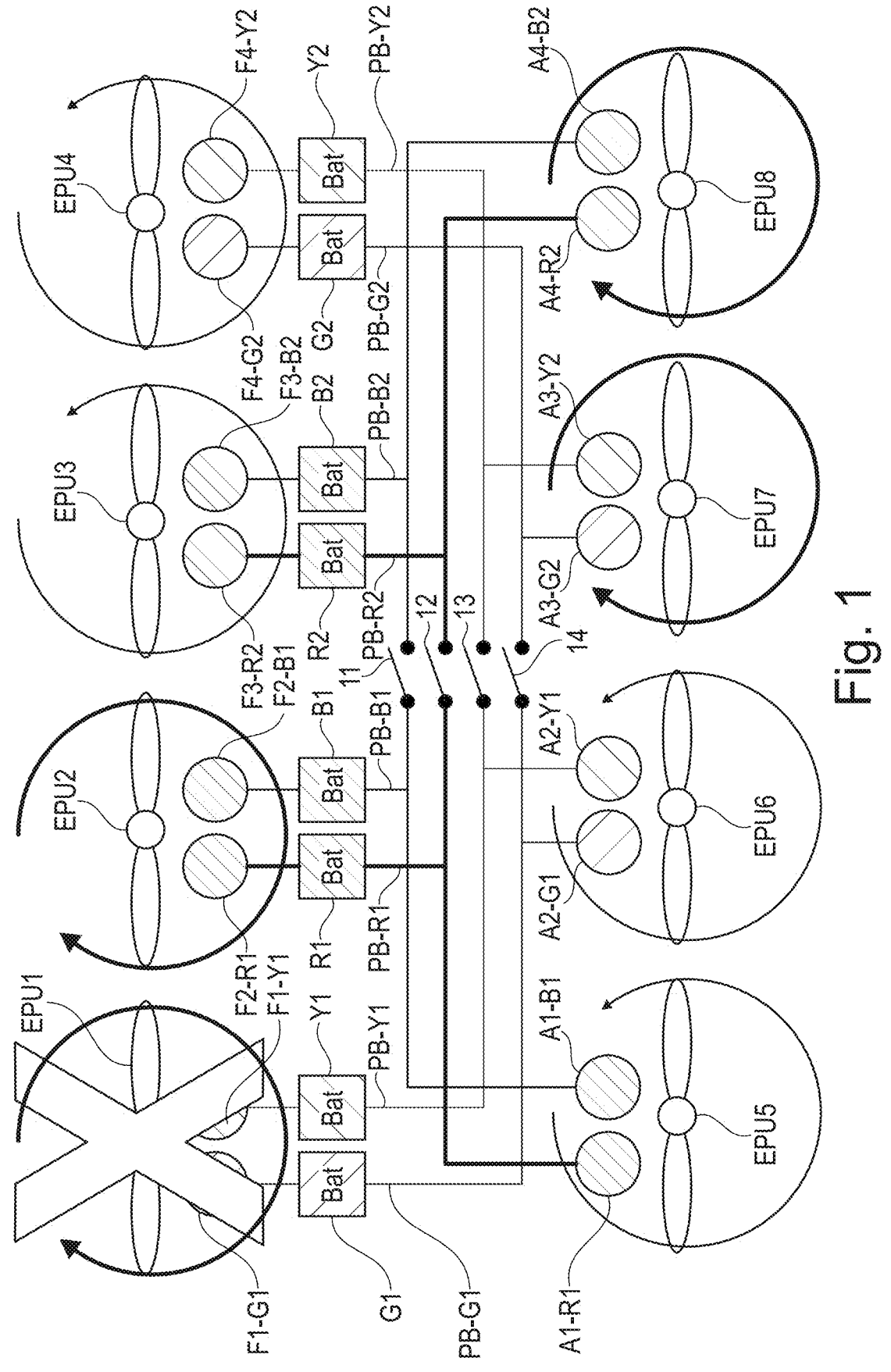
FIG. 1 shows an embodiment of multilane power distribution system including multiple batteries and multiple electronic propulsion units, wherein two associated lanes and batteries may be electrically connected through contactors.

With increased penetration of electrical systems and the progression towards full electric and hybrid propulsion systems, the use of DC multilane power distribution systems has gained increased use. FIG. 1 shows schematically an example embodiment of a DC multilane power distribution system, wherein the system includes a plurality of power sources G1, G2, Y1, Y2, B1, B2, R1, R2 and a plurality of load devices EPU 1 to EPU 8, which are connected through a DC distribution system. Such system may be used in hybrid propulsion system applications.

The power sources G1, G2, Y1, Y2, B1, B2, R1, R2 may be or include batteries and are, in the following, referred to as batteries, without limiting the power sources to batteries. For example, in aerospace applications, the power sources may alternatively be fuel cells or a rectifier extracting power from a turbo generator. The load devices EPU 1 to EPU 8 may be electronic propulsion units (EPUs) and are, in the following, referred to as EPUs, without limiting the load devices to EPUs.

The architecture of the multilane power distribution system of FIG. 1 implements redundancy and power sharing aspects as follows.

First, each battery G1, G2, Y1, Y2, B1, B2, R1, R2 powers two EPUs. For example, battery G1 powers EPU 1 and EPU 6. In another example, battery G2 powers EPU 4 and EPU 7.

Second, each of the EPUs EPU 1 to EPU 8 is powered by two of the batteries G1, G2, Y1, Y2, B1, B2, R1, R2. For example, EPU 1 is powered by battery G1 and by battery Y1. EPU 2 is powered by battery R1 and battery B1. EPU 3 is powered by battery R2 and by battery B2, etc.

Third, two of the batteries are assigned to each other in the sense that a particular of the batteries may be electrically connected to another one of the batteries, wherein each battery may be connected to one associated other battery only. For example, batteries G1, G2 are assigned to each other. They may be connected through a contactor 14 that connects the respective power buses (also referred to as lanes) PB-G1, PB-G2.

In a similar manner, batteries Y1, Y2 are assigned to each other. They may be connected through a contactor 13 that connects the respective power busses PB-Y1, PB-Y2. Further, batteries R1, R2 are assigned to each other. They may be connected through a contactor 12 that connects the respective power buses PB-R1, PB-R2. Also, batteries B1, B2 are assigned to each other. They may be connected through a contactor 11 that connects the respective power buses PB-B1, PB-B2.

The power busses PB-G1/2, PB-Y1/2, PB-B1/2, PB-R1/2 form a DC distribution network, wherein two associated batteries and their corresponding lanes/power buses (such as batteries G1, G2 and power buses PB-G1, PB-G2) form a sub-distribution system within the overall DC distribution system.

Figure 2:
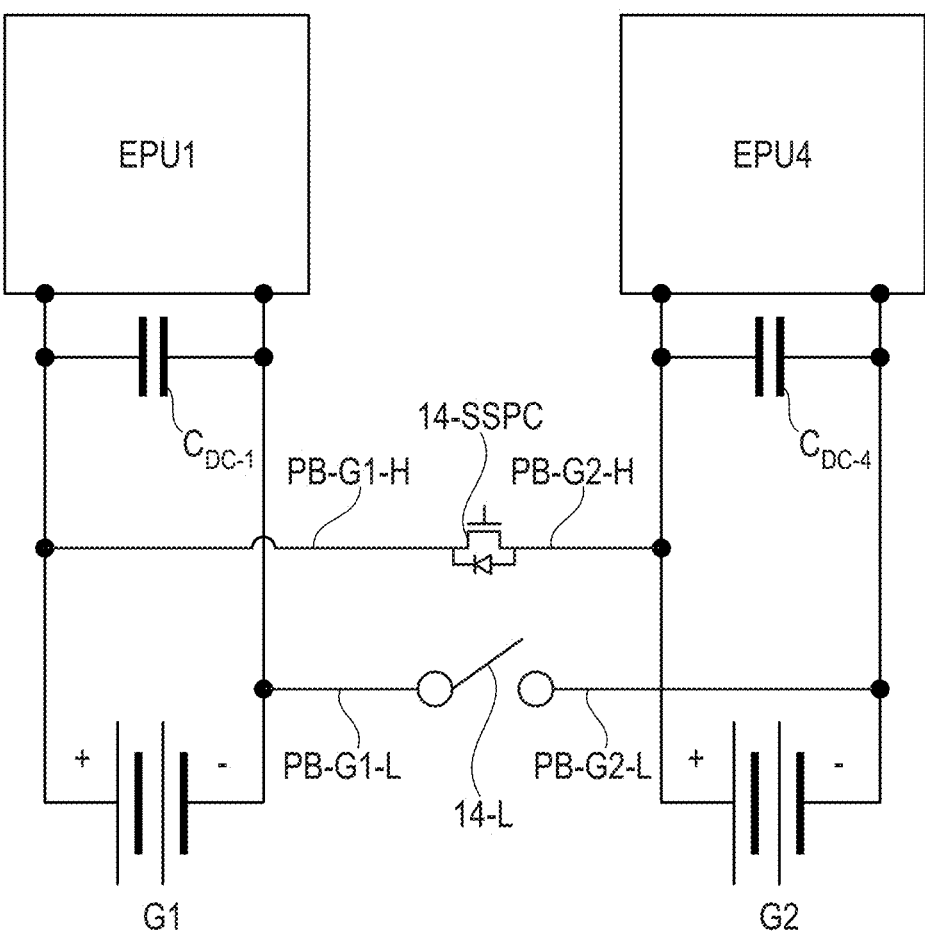
FIG. 2 is an embodiment of a sub-distribution system of the distribution system of FIG. 1, wherein the sub-distribution system includes two batteries connected through a power line that has a high side voltage rail and a low side voltage rail, and wherein the subsystem further includes an SSPC in the high side voltage rail and a contactor in the low side voltage rail.

Each power bus includes a high side voltage rail connected to a positive battery voltage and a low side voltage rail connected to a negative battery voltage, as seen, e.g., in FIG. 2. The contactors 11-14 each include a contactor for the high side voltage rail and a contactor for the low side voltage rail, as also seen, e.g., in FIG. 2. When two batteries are connected, the high side voltage rails are connected and the low side voltage rails are connected (parallel connection).

The network of FIG. 1 represents an example network only. Other network configurations may be implemented as well. For example, in other embodiments, three or more of the batteries are assigned to each other in the sense that they may be electrically connected to each other. In another example, the architecture may include a ring architecture, wherein two or more than two batteries are connected at given time.

Each of the EPUs, EPU 1 to EPU 8, includes two electrical motors. For example, EPU 1 includes electric motor F1-G1 driven by battery G1 through a power converter/inverter (not shown). EPU 1 further includes electric motor F1-Y1 driven by battery Y1 through another power converter/inverter (not shown). For example, each power converter provides for a three phase alternating current that drives the respective electric motors F1-G1 and F1-Y1. In this respect, the electric motors, such as electric motors F1-G1 and F1-Y1, may be two physically different machines connected to the same shaft, or may be two sets of windings wound in the same machine, each fed by a different power converter.

In a similar manner, each of the other EPUs (e.g., EPU 2-8) includes two electrical motors F2-R1, F2-B1, F3-R2, F3-B2, F4-G2, F4-Y2, A1-R1, A1-B1, A2-G1, A1-Y1, A3-G2, A3-Y2, A4-R2, A4-B2, and corresponding power converters as well.

In the depicted embodiment, the EPUs may include propellers, wherein some of the propellers turn in one direction and the same number of propellers turn in the other direction, such as is used in e-VTOLs. However, this represents an embodiment only.

During certain mission profiles, the lanes are kept independent, whereas, under certain conditions, the lanes may be connected to allow sharing of power from the batteries. For example, in FIG. 1, it is schematically illustrated as an example that EPU 1 fails. In such case, it is sensible to diverge the energies of the batteries G1, Y1 to some of other EPUs by closing contactors 13 and 14.

Accordingly, it is beneficial under certain conditions, for example, during a failure condition, to electrically connect batteries that are associated and together form a sub-distribution system, such as electrically connecting batteries G1, G2 through contactor 14 or batteries Y1, Y2 through contactor 13. However, sharing energy stored in batteries is not straightforward, and different batteries will be discharged differently and will, therefore, have different voltages at the time they are connected. When batteries are connected that have different voltages, this would result in unwanted inrush current and/or current flowing among the batteries.

Further, as discussed with respect to FIG. 2, there may be load capacities present or associated with the loads of the batteries, wherein such load capacities may also cause an inrush current.

FIG. 2 depicts a sub-distribution system of the distribution system of FIG. 1 in accordance with the present disclosure. The sub-distribution system includes batteries G1, G2 and EPUs EPU 1 and EPU 4, as depicted in FIG. 1. A power bus PB-G1 connected to battery G1 includes a high side voltage rail PB-G1-H and a low side voltage rail PB-G1-L. In a similar manner, a power bus PB-G2 connected to battery G2 includes a high side voltage rail PB-G2-H and a low side voltage rail PB-G2-L.

In between the voltage rails is a pulse-width modulated switch SSPC 14, which is implemented as an SSPC and connects the high side voltage rails PB-G1-H, PB-G2-H in accordance with its duty cycle. Further, a contactor 14-L is provided that connects the low side voltage rails PB-G1-L, PB-G2-L. The SSPC 14-SSPC may also be referred to as bus-tie SSPC and the contactor 14-L may also be referred to as bus-tie contactor.

The batteries G1, G2 contact through the voltage rails also the EPUs EPU 1 and EPU 4, respectively. FIG. 2 further shows filtering capacities CDC-1, CDC-4 between the respective high side voltage rails and low side voltage rails. The voltage rails with mounted filtering capacitors CDC and connected to the battery G1, G2 may be termed as DC link and the filtering capacitors CDC may be termed as DC link capacitors, which are meant to filter any AC noise present in the DC line, e.g., when operating at higher voltage levels. The filtering capacitors CDC and possibly further capacitors within or associated with the load provide for a capacitive load that provide for a high inrush current in the power buses PB-G1, PB-G2 are connected by contactors only. In addition, an inrush current may be produced by a different voltage the batteries G1, G2 present before the contactors are closed.

Figure 3:
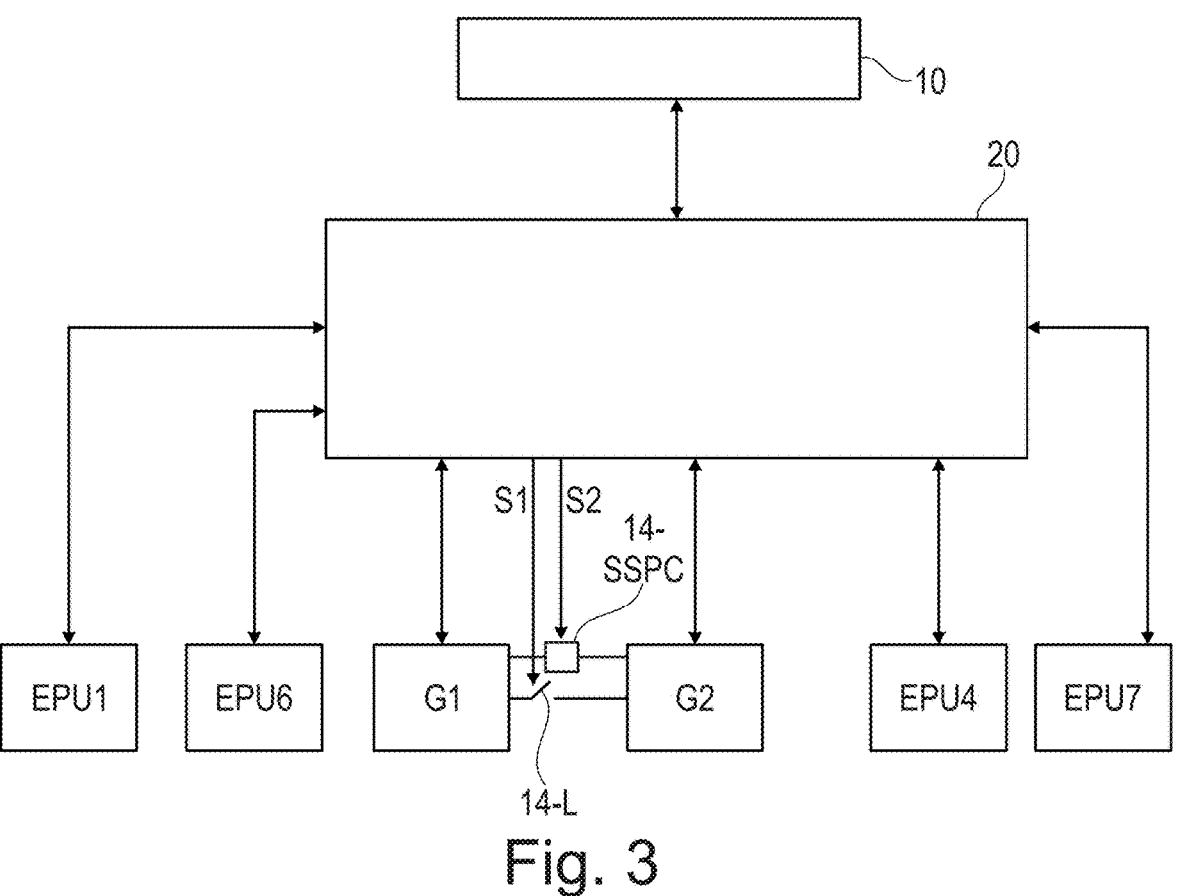
FIG. 3 shows an embodiment of a control system for controlling a multilane power distribution system such as the system of FIG. 1.

To avoid the presence of an inrush current when the two batteries G1, G2 are connected through the switchable elements 14-SSPC, 14-L, the duty cycle of the SSPC is controlled in a specific manner by a control unit, as is discussed with respect to FIG. 3.

FIG. 3 shows a system design in which a control unit 20 controls operation of the batteries, the EPUs, and the switching elements. In FIG. 3, for simplicity, only two of the batteries G1, G2, the contactors 14-SSPC and 14-L connecting these batteries G1, G2, and the EPUs driven by these batteries (EPUs 1, 6, 4 and 7 in accordance with FIG. 1) are shown, wherein all the batteries, EPUs, corresponding converters and electric motors, and switchable elements communicate with the control unit 20. The control unit 20 may further communicate with an aircraft controller 10.

More particularly, in FIG. 3, the batteries G1, G2 provide information to the control unit 20 such as voltage, current, and temperature. Battery G1 powers EPU 1 and EPU 6. In a similar manner, battery G2 powers EPU 4 and EPU 7. The control unit 20 also controls operation of the EPUs and the amount of energy provided to the EPUs.

The control unit 20 further controls whether two batteries such as batteries G1, G2 are to be connected. To this end, the control unit 20 provides control signals S1, S2 to the SSPC 14-SSPC and the contactor 14-L. The control signal S1 to the contactor regards the state of the contactor, i.e., whether the contactor is switched on (closed) or is switched off (opened).

Figure 4:
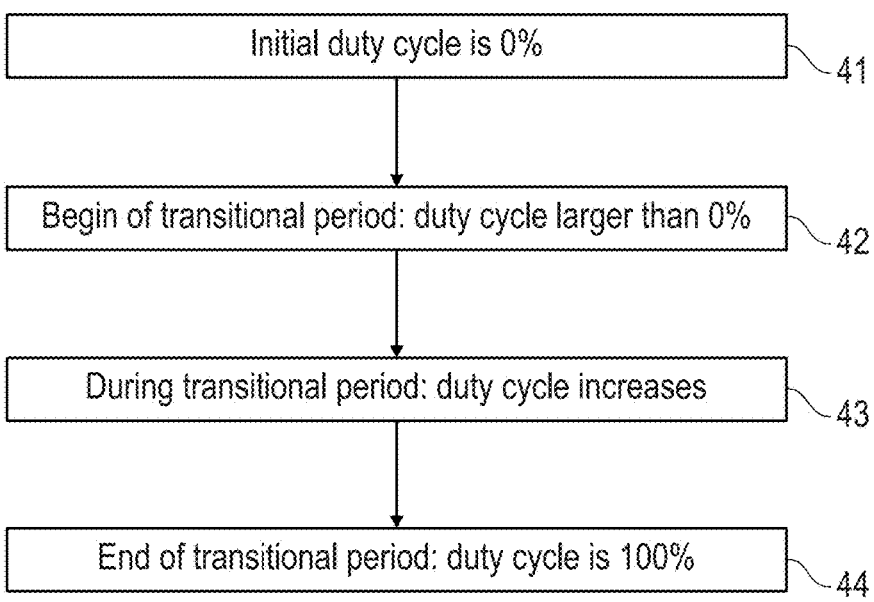
FIG. 4 is a flowchart of an example of a method for controlling the SSPC of FIG. 2, wherein the duty cycle of the SSPC is increased in a transitional period.

The control signal S2 to the SSPC defines the duty cycle of the SSPC. An example of control sequence is depicted in FIG. 4. According to FIG. 4, in act 41, the initial duty cycle is 0%, i.e., the SSPC is switched off and no current may flow through the SSPC. If the batteries G1, G2 shall be electrically connected, a transitional period is implemented in which the duty cycle rises to 100%. In act 42, at the beginning of the transitional period, the duty cycle is set to a value larger than 0%. This initial value may depend on the voltage difference over the respective voltage rails PB-G1-H and PB-G2-H. The initial value of the duty cycle may be very low and may be in the range between 0.1% and 10%. As the SSPC guides current only intermittently in accordance with the pulse width modulation, the current passing the SSPC is highly limited at the beginning of the transitional period, thereby preventing the presence of an inrush current.

In act 43, during the transitional period, the duty cycle increases. The increase may be linearly or non-linearly such as in steps. The course of the increase is programmed.

In act 44, at the end of the transitional period, the duty cycle reaches 100%, at which point the respective power buses are fully collected.

The contactor 14-L may be switched on at the beginning or shortly before the beginning of the transitional period.

Figure 5:
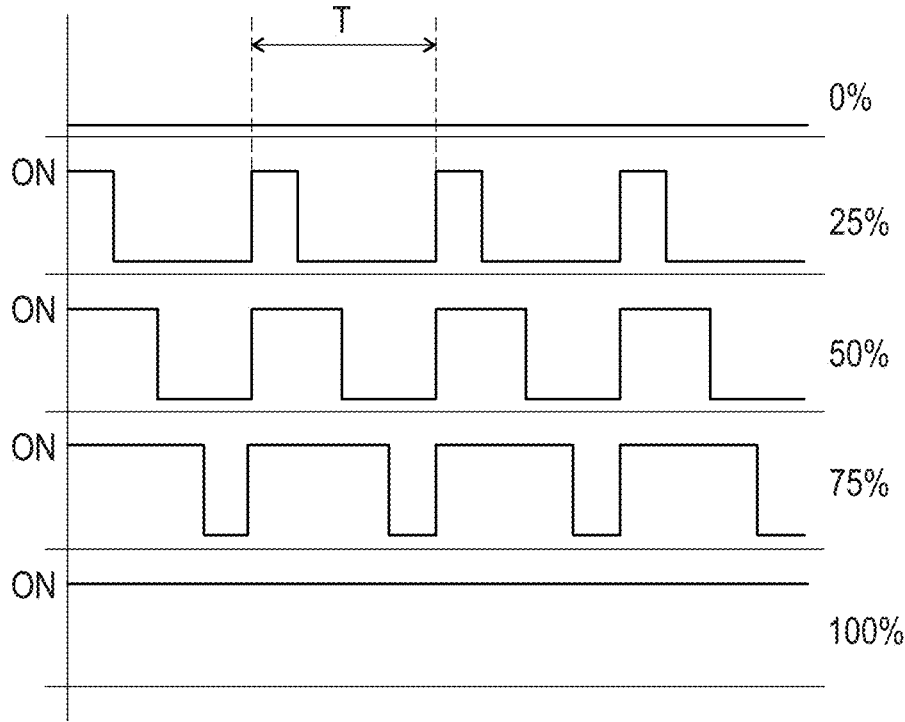
FIG. 5 is a diagram showing schematically examples of different duty cycles within the transitional period of FIG. 4.

FIG. 5 shows examples of different duty cycles that may be implemented by the SSPC 14-SSPC under the control of the control unit 20. When the duty cycle is at 0%, the SSPC is permanently opened such that no current may flow through the SSPC. If the duty cycle is at 25%, the SSPC is switched on for 25% of the time period T and thus guiding current for 25% percent of the time. This relation may increase to 50 percent and 75 percent. When the duty cycle is 100%, the SSPC is fully closed and thus guiding current constantly.

The use of an SSPC as one of the switches that connect the voltage rails PB-G1 and PB-G2 and thus the respective batteries G1, G2 allows to limit the inrush current due to the interrupted time periods in which the SSPC is guiding current in accordance with the applied pulse-width modulation/duty cycle.

It should be understood that the above description is intended for illustrative purposes only and is not intended to limit the scope of the present disclosure in any way. Also, those skilled in the art will appreciate that other aspects of the disclosure may be obtained from a study of the drawings, the disclosure, and the appended claims. All methods described herein may be performed in any suitable order unless otherwise indicated herein or otherwise clearly contradicted by context. Various features of the various embodiments disclosed herein may be combined in different combinations to create new embodiments within the scope of the present disclosure. In particular, the disclosure extends to and includes all combinations and sub-combinations of one or more features described herein. Any ranges given herein include any and all specific values within the range and any and all sub-ranges within the given range.

The invention claimed is:

1. A multilane power distribution system comprising:
a plurality of direct current (DC) power sources;
a plurality of load devices, wherein each DC power source of the plurality of DC power sources is configured to power at least two load devices of the plurality of load devices, and wherein each load device of the plurality of load devices is configured to be powered by at least two DC power sources of the plurality of DC power sources;
a DC connection network comprising power buses for connecting the plurality of DC power sources and the plurality of load devices, wherein the power buses have a high side voltage rail for a positive voltage and a low side voltage rail for a negative voltage; and
a control unit,
wherein at least two power buses of the power buses are connectable by switchable elements,
wherein the switchable elements comprise a first switchable element for the high side voltage rail and a second switchable element for the low side voltage rail,
wherein the control unit is configured to control states of the first switchable element and the second switchable element,
wherein the control unit is further configured to centrally control every DC power source of the plurality of DC power sources, every switchable element of the switchable elements, and every load device of the plurality of load devices,
wherein the switchable elements, when switched on, electrically connect terminals of two DC power sources of the plurality of DC power sources connected by the respective power buses, and
wherein one switchable element of the switchable elements is a pulse-width modulated switch that electrically connects the respective voltage rails in accordance with a pulse-width modulation.

2. The multilane power distribution system of claim 1, wherein the first switchable element is the pulse-width modulated switch.

3. The multilane power distribution system of claim 2, wherein the second switchable element is a contactor.

4. The multilane power distribution system of claim 1, wherein the control unit is further configured to control the pulse-width modulated switch such that a duty cycle of the pulse-width modulated switch is:
0% before the plurality of DC power sources are connected;
between 0% and 100% in a transitional period after the high side voltage rail and the low side voltage rail are being connected, wherein the duty cycle increases over time during the transitional period; and
100% after the transitional period, when the two DC power sources are fully connected.

5. The multilane power distribution system of claim 4, wherein the control unit is further configured to control the pulse-width modulated switch such that an initial duty cycle of the pulse-width modulated switch in the transitional period depends on an initial voltage difference over the pulse-width modulated switch.

6. The multilane power distribution system of claim 5, wherein the control unit is further configured to control the pulse-width modulated switch such that a duty cycle of the pulse-width modulated switch rises linearly during the transitional period.

7. The multilane power distribution system of claim 6, wherein the control unit is further configured to centrally control every DC power source of the plurality of DC power sources, every switchable element of the switchable elements, and every load device of the plurality of load devices.

8. The multilane power distribution system of claim 4, wherein the control unit is further configured to control the pulse-width modulated switch such that a duty cycle of the pulse-width modulated switch rises linearly during the transitional period.

9. The multilane power distribution system of claim 4, wherein the control unit is further configured to centrally control every DC power source of the plurality of DC power sources, every switchable element of the switchable elements, and every load device of the plurality of load devices.

10. The multilane power distribution system of claim 1, wherein the pulse-width modulated switch is a solid state power controller.

11. The multilane power distribution system of claim 1, wherein each DC power source of the plurality of DC power sources is configured to power at least two load devices of the plurality of load devices through a respective power converter, and wherein each power converter is configured to drive one load device of the plurality of load devices.

12. The multilane power distribution system of claim 1, wherein the DC connection network is configured such that one considered DC power source of the plurality of DC power sources is connectable to only one other DC power source of the plurality of DC power sources, such that there is at least one pair of associated DC power sources, and wherein the at least one pair of associated DC power sources are connectable through the switchable elements.

13. The multilane power distribution system of claim 1, wherein a DC power source of the plurality of DC power sources comprises an electric battery, and/or wherein a load device of the plurality of load devices comprises an electric motor.

\* \* \* \* \*